(12) United States Patent
Uebelacker (10) Patent No.: US 10,112,504 B2
(45) Date of Patent: Oct. 30, 2018

(54) FOLDING SEAT

(71) Applicant: GRAMMER AG, Amberg (DE)

(72) Inventor: Roland Uebelacker, Pfreimd (DE)

(73) Assignee: GRAMMER AG, Amberg (DE)

( * ) Notice: Subject to any disclaimer, the term of this patent is extended or adjusted under 35 U.S.C. 154(b) by 235 days.

(21) Appl. No.: 14/932,090

(22) Filed: Nov. 4, 2015

(65) Prior Publication Data

US 2016/0121757 A1    May 5, 2016

(30) Foreign Application Priority Data

Nov. 4, 2014 (DE) .................. 10 2014 116 064

(51) Int. Cl.
| | |
|---|---|
| *B60N 2/20* | (2006.01) |
| *B60N 2/02* | (2006.01) |
| *B60N 2/24* | (2006.01) |
| *B60N 2/68* | (2006.01) |
| *B60N 2/30* | (2006.01) |
| *B61D 33/00* | (2006.01) |

(52) U.S. Cl.
CPC ............... *B60N 2/02* (2013.01); *B60N 2/242* (2013.01); *B60N 2/305* (2013.01); *B60N 2/3013* (2013.01); *B60N 2/68* (2013.01); *B61D 33/0057* (2013.01)

(58) Field of Classification Search
CPC ........ B60N 2/02; B60N 2/242; B60N 2/3013; B60N 2/305; B60N 2/68; B61D 33/0057
USPC ........................................ 297/335, 331, 332
See application file for complete search history.

(56) References Cited

U.S. PATENT DOCUMENTS

| | | | | |
|---|---|---|---|---|
| 1,467,582 | A * | 9/1923 | Lang .................. | B60N 2/10 297/331 |
| 3,655,239 | A * | 4/1972 | Agosti ................ | A47C 1/12 297/248 |
| 4,610,479 | A * | 9/1986 | Pouzoulet .......... | A47C 1/121 297/332 |
| 4,799,632 | A * | 1/1989 | Baymak ............. | B64D 11/0691 244/122 R |
| 5,498,052 | A | 3/1996 | Severini et al. | |

(Continued)

FOREIGN PATENT DOCUMENTS

| | | |
|---|---|---|
| CA | 2708016 | 6/2009 |
| CN | 203207572 | 9/2013 |

(Continued)

OTHER PUBLICATIONS

German Examination Report dated Jun. 12, 2015, for German Application No. 10 2014 116 063.9.

(Continued)

*Primary Examiner* — Syed A Islam
(74) *Attorney, Agent, or Firm* — Sheridan Ross PC (57) ABSTRACT

Vehicle seat comprising a backrest, a seat part and a seat part substructure, the seat part substructure being mounted such that it can swivel about a first swivel axis arranged in the width direction of the seat in order to move the seat part substructure together with the seat part from a sitting position into an upright position, a lower region of the backrest with respect to a height direction of the seat and a rear region of the seat part and/or of the seat part substructure with respect to a longitudinal direction of the seat being interconnected in the sitting position by at least one releasable connection means and not being interconnected in the upright position.

15 Claims, 4 Drawing Sheets

(56) References Cited

U.S. PATENT DOCUMENTS

| | | | |
|---|---|---|---|
| 6,890,032 B2 * | 5/2005 | Fewchuk | A47B 3/08 |
| | | | 108/129 |
| 2012/0091771 A1 * | 4/2012 | Haller | B60N 2/206 |
| | | | 297/335 |

FOREIGN PATENT DOCUMENTS

| | | |
|---|---|---|
| CN | 203943265 | 11/2014 |
| DE | 103 10 762 A1 | 10/2003 |
| DE | 60 2004 003 285 T2 | 6/2007 |
| EP | 0 211 248 A2 | 2/1987 |
| FR | 2 524 285 A1 | 10/1983 |
| FR | 2894897 | 6/2007 |
| KR | 10-1284316 | 7/2013 |
| WO | WO 2014/001209 | 1/2014 |

OTHER PUBLICATIONS

Official Action with English Translation for China Patent Application No. 2015107382618, dated May 26, 2017, 19 pages.
Official Action for German Patent Application No. 102014116064.9, dated Jan. 16, 2018, 3 pages.

* cited by examiner

FOLDING SEAT

CROSS-REFERENCE TO RELATED APPLICATIONS

This application claims the benefit of German Patent Application No. DE 10 2014 116 064.9, filed Nov. 4, 2014, the entire content of which is incorporated herein by reference.

FIELD

The invention relates to a vehicle seat comprising a backrest, a seat part and a seat part substructure, the seat part substructure being mounted such that it can swivel about a first swivel axis arranged in the width direction of the seat in order to move the seat part substructure together with the seat part from a sitting position into an upright position.

BACKGROUND

Folding vehicle seats which are used in particular in passenger transportation, such as for example in passenger trains, buses or aircraft are known from the prior art. The folding configuration makes it possible to create more free space inside a wagon for example or also, particularly when a plurality of seats is positioned next to one another, as is usual in buses for example, to facilitate entry.

Folding seats of this type in this respect comprise a backrest and a seat part, the seat part being arranged such that it can swivel relative to the backrest. In this respect, the seat part and the backrest are always interconnected via the swivellable connection, such as by a swivel axis. In this respect, the backrest is generally attached to the wagon itself.

To be able to save space, folding seats of this type have a relatively thin seat cushion so that the seat part can be swivelled upwards as far as possible, as a result of which, however, the passenger's sitting comfort is significantly reduced, particularly during relatively long journeys. To avoid this problem, seats have been developed which have a swivel axis which is moved forwards in the width direction of the seat. However, this measure again restricts the free space.

Furthermore, since the backrest is rigid, be it due to attachment to the wagon or to safety regulations, the adjustment options of the seat according to a passenger's understanding of comfort are overall very limited.

SUMMARY

Consequently, it is the object of the present invention to provide a folding seat which both can be fitted in a space-saving manner and can be adjusted according to a passenger's wishes and requirements with regard to sitting comfort.

This object is achieved according to the features of claim 1.

An essential point of the invention is to provide a vehicle seat comprising a backrest, a seat part and a seat part substructure, the seat part substructure being mounted such that it can swivel about a first swivel axis arranged in the width direction of the seat in order to move the seat part substructure together with the seat part from a sitting position into an upright position, so that a lower region of the backrest with respect to a height direction of the seat and a rear region of the seat part and/or of the seat part substructure with respect to a longitudinal direction of the seat are interconnected in the sitting position by at least one releasable connection means and are not interconnected in the upright position.

Here, "sitting position" describes the position in which a passenger can sit on the seat part. In the present context, the sitting position thus describes a non-swivelled seat part substructure so that the seat part substructure is oriented substantially horizontally.

"Upright position" describes a swivelled position of the seat part substructure in which the seat part substructure has been swivelled out of the substantially horizontal position into a substantially vertical position. Here, it is advantageous if a region of the backrest, located higher than the lower region of the backrest seen in the height direction of the seat, serves as a resting point for the seat part, so that the seat part is stable in the upright position and is not inadvertently swivelled back without further intervention by a passenger.

The seat part substructure can be of any configuration. However, to allow a simple production and a steady swivelling movement, the seat part substructure is preferably configured symmetrically with respect to the longitudinal direction of the seat.

The first swivel axis according to the invention can in this respect in principle be connected in any manner to the seat part substructure. However, it is advantageous if the swivel axis is arranged in the rear half of the seat part substructure, seen in the longitudinal direction of the seat. It is also advantageous for the first swivel axis to be arranged in a lower region of the seat part substructure with respect to the height direction of the seat, thereby making it possible to save more space.

The seat part preferably has a cushion element to enhance the sitting comfort of a passenger sitting in the seat. In this folding seat according to the invention, the cushion element can be configured very generously in the height extent thereof.

According to the invention, the seat has a releasable connection means which interconnects a lower region of the backrest and a rear region of the seat part and/or of the seat part substructure in the sitting position and does not interconnect them in the upright position. Therefore, this means that during a swivelling movement of the seat part substructure out of the sitting position into the upright position, the connection of the backrest to the seat part and/or to the seat part substructure is released. Consequently, complex constructions in particular are avoided, because the first swivel axis of the seat part substructure is not the same as a swivel axis of the backrest. Instead, during a swivelling movement, the backrest and the seat part and/or the seat part substructure are independent of one another, seen from a construction point of view.

According to a preferred embodiment, the seat part is movable with respect to the seat part substructure at least in the longitudinal direction of the seat. A movable seat part of this type means that it is possible for the passenger to change his sitting position as desired. A movement of the seat part is also advantageous to that effect since, for example in the upright position, the seat part can also still be moved to optimise the free space which has been created, for example depending on the type and shape of the payload, such as pieces of luggage.

It is particularly advantageous if, during a movement of the seat part with respect to the seat part substructure, the lower region of the backrest is connected to the seat part and/or to the seat part substructure by the at least one releasable connection means while retaining the sitting position. Therefore, this means that when the seat part substructure is in the sitting position, i.e. in the substantially horizontal position, the lower end of the backrest is still connected to the seat part and/or the seat part substructure by the releasable connection, even during movement of the seat part relative to the seat part substructure. Furthermore, this connection is released when the seat part substructure is swivelled out of the sitting position into the upright position, irrespective of the position of the seat part relative to the seat part substructure.

Advantageously, the connection between the backrest and the seat part and/or the seat part frame by the releasable connection element is produced automatically during a swivelling procedure from the upright position into the sitting position. However, it is also conceivable for this connection to be produced manually.

The at least one releasable connection element can in this respect either be connected permanently or releasably to the seat part and/or to the seat part frame. The at least one connection element can advantageously be moved in the longitudinal direction of the seat part and/or of the seat part substructure. For example, the free space for the lower element can be influenced thereby, but it can also be moved so that, for example, it is fully received in the seat part and thus also creates additional space in the upright position or during the swivelling movement of the seat part substructure.

It is particularly advantageous for the mode of operation of the folding seat if the at least one releasable connection means is configured as a hook element. A hook element is to be understood as an element which receives the lower end of the backrest during a swivelling movement into the sitting position, without further intervention, and which is also automatically released from the lower end of the backrest during a swivelling movement into the upright position.

In this respect, the hook element can be configured in many different ways. The hook element can be provided in a particularly economical and simple manner when it comprises an angle plate and/or is arched. An arched configuration is, for example, an asymmetrical U-shaped element. The hook element can naturally also be produced from very diverse materials, such as aluminium, to make it possible to reduce weight, or from commercially available steel.

The hooking procedure, i.e. receiving the lower region of the backrest, can be achieved particularly easily if the hook element, in particular the angle plate, advantageously has on an upwardly directed region an arched portion, a C-shaped portion or a portion which is formed forwards with respect to the longitudinal direction of the seat. Of course, other configurations are also possible which are not described separately here.

It is particularly advantageous if the at least one releasable connection means, thus for example the hook element, is arranged on a rear end region of the seat part. Consequently, during movement of the seat part relative to the seat part substructure, at least the lower end of the backrest is also moved in the same direction. Therefore, it is advantageous if the backrest is flexible at least in its lower region in the longitudinal direction of the seat.

Furthermore, if the backrest and also the seat part substructure are connected to a specific seat frame, the backrest can advantageously also be suspended on the seat frame such that it can swivel about a second swivel axis in the width direction of the seat.

Therefore, the backrest can be adjusted by moving the seat part into the sitting position. The adjustment of the backrest is such that the inclination angle of the backrest relative to a horizontal axis can be changed. If the seat part is moved backwards, the inclination angle increases, the backrest is oriented more steeply; when the inclination angle is reduced, the backrest is flatter. Due to the movement of the seat part and to the ensuing adjustment of the backrest inclination, the rearwards space requirement, seen in the longitudinal direction of the seat, is however not impaired if the second swivel axis is advantageously arranged as high up as possible, seen in the height direction of the seat. Consequently it is possible to fit the seat close to a wagon wall, for example. Installing a plurality of such seats in tandem provides the advantage that the space requirement, for example leg space, is not substantially restricted for a passenger sitting behind the seat.

The free space behind the seat can be further optimised if the backrest is not configured to be straight, but analogously to the anatomy of a passenger's back.

The sitting position can be advantageously adjusted if the seat part substructure has at least one end stop in the rear region thereof and if the seat frame has at least one cross strut which extends in the width direction of the seat and on which the at least one end stop rests in the sitting position to hold the seat part substructure together with the first swivel axis in the sitting position.

The at least one end stop can be configured in many different ways. In this respect, it can be an extension of the seat part substructure or also the rear end region of the seat part substructure. It is also conceivable for the at least one end stop to be connected subsequently to the seat part substructure, for example by welding or screwing. Furthermore, a protective layer, for example a rubber coating, a plastics material or the like can be applied to the at least one end stop to promote a greater durability of the components. Moreover, a spring characteristic, albeit a low spring characteristic is inherent in the at least one end stop.

As already mentioned above, it is therefore advantageous if the swivel axis is arranged in the rear half of the seat part substructure, specifically such that the weight of the front half of the seat part substructure is great enough to press the rear half of the seat part substructure from below against the strut. This measure prevents an unintentional swivelling movement of the seat part substructure.

In principle, the seat part substructure can swivel in different ways. In this respect, the most economical solution is swivelling by hand, but it is also possible to realise a swivelling movement by a motor, advantageously by an electric motor.

Furthermore, it is conceivable to easily influence the sitting position in that the at least one cross strut is adjustable at least in the height direction of the seat. The adjustment is advantageously such that the rear end of the seat part substructure is still pressed against the at least one cross strut.

Furthermore, it is advantageous if the at least one cross strut has at least one recess. This prevents contact between the at least one cross strut and the at least one connection means during a swivelling movement of the seat part substructure, particularly when the seat part has been pushed fully backwards, seen in the longitudinal direction of the seat and without the recess, the at least one connection means would strike the at least one cross strut. To still be able to ensure the maximum backwards movement of the seat part, at least one recess is provided in the at least one cross strut so that the at least one recess can receive the at least one connection means without contacting it. Therefore, this measure further optimises the adjustment possibilities of the seat part.

In this respect, the seat part substructure can be produced from a plurality of materials, but materials are preferably to be used which, on the one hand, are adequately stable and on the other are light and economical. In addition to steel, the standard material, aluminium is also possible, as are specific composite materials.

Further advantageous embodiments are provided in the subclaims.

BRIEF DESCRIPTION OF THE DRAWINGS

Further objectives, advantages and appropriate uses of the present invention are revealed in the following description in connection with the drawings, in which.

DETAILED DESCRIPTION

Figures 1A, 1B:
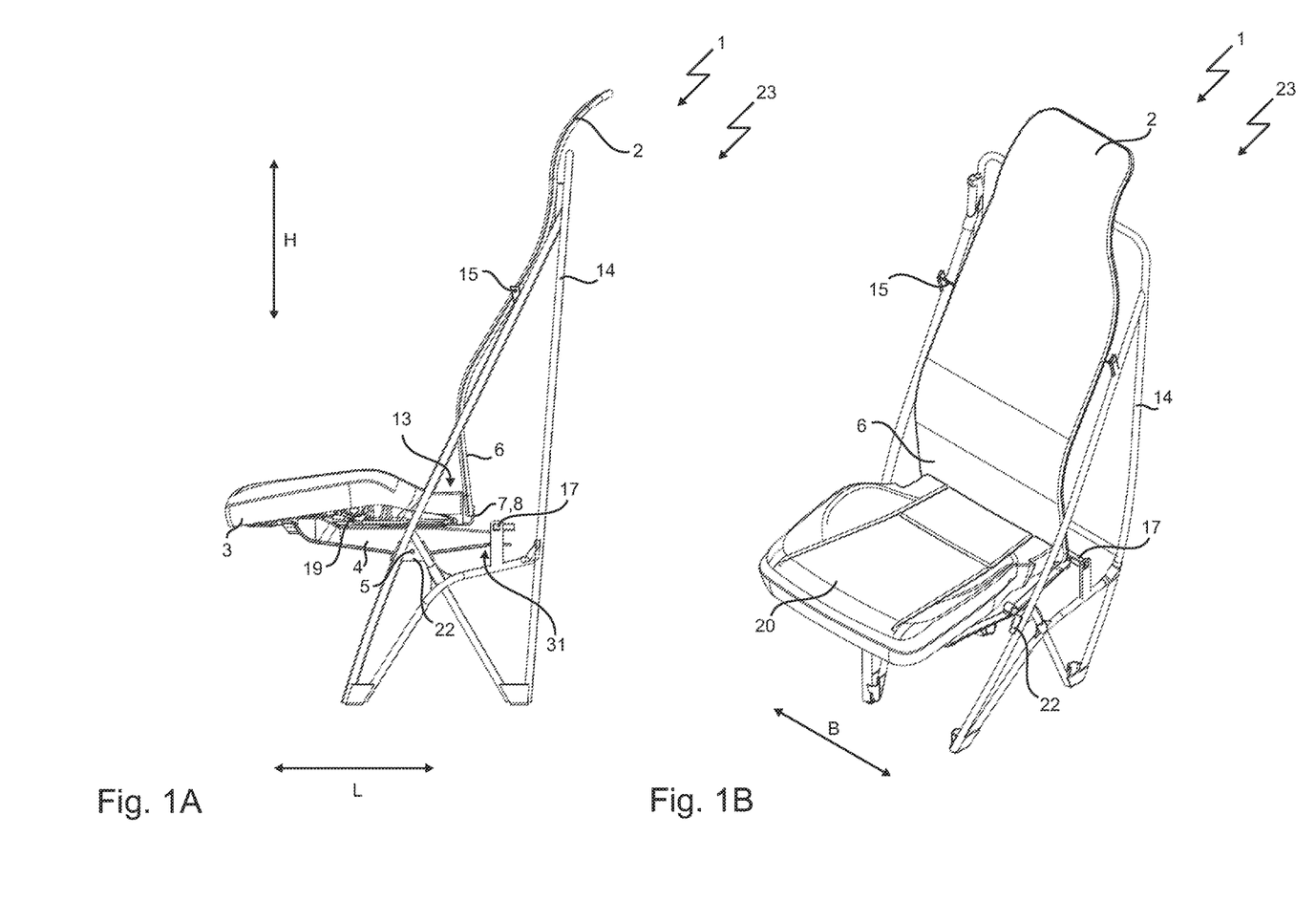
FIG. 1A is a side view of a vehicle seat in the sitting position.
FIG. 1B is a perspective view of the vehicle seat according to FIG. 1A.

The folding seat 1 shown in FIGS. 1A and 1B comprises a backrest 2, a seat part 3 which here has a seat shell 19, and a seat part substructure 4 which is mounted such that it can swivel about a first swivel axis 5. A releasable connection means 7 can also be seen which connects the seat part 3 and the lower end 6 of the backrest 2. Furthermore, the figure shows a seat frame 14 to which the backrest 2 is attached by the second swivel axis 15 and to which the seat part substructure 4 is attached by the first swivel axis 5 and a mount 22 which is attached to the seat frame 14. It is also conceivable that the second swivel axis 15 can also be fitted lower down or higher up, seen in the height direction H of the seat.

The seat shell 19 is for example capable of giving the seat cushion 20 a specific contour and of connecting it to the seat part substructure 4, for example by a screw connection. The seat part 3 is in particular movable with respect to the seat part substructure 4 at least in the longitudinal direction L of the seat, for example by a movement means which can comprise rail elements (not shown here) or the like. The cushion 20 can consist of all kinds of materials. Thus, it is conceivable that different foam materials can be used as the cushion, which foamed materials are also covered with a fabric for protection.

The folding seat 1 shown in FIGS. 1A and 1B is in the sitting position 23, i.e. the seat part 3 is in a substantially horizontal position, thereby allowing the passenger to easily sit down on the seat 1. Even if a passenger is not sitting on the seat part 3 in the sitting position 23, due to the arrangement of the first swivel axis 5 in the rear half of the seat part substructure 4, of the cross strut 17 which has a recess 18, and the end stop 16 the sitting position 23 is held, since due to the arrangement of the first swivel axis 5, the front part (the arrangement from the first swivel axis 5 to the front end of the seat part 3 and/or of the seat part substructure 4 seen from the longitudinal direction L of the seat) tends to move downwards in the height direction of the seat. Consequently, the end stop 16 which here is simultaneously also the rear end of the seat part substructure 4 is moved upwards in the height direction of the seat and thus presses against the cross strut 17. The seat part substructure 4 is therefore held in the sitting position 23.

Figures 3A, 3B:
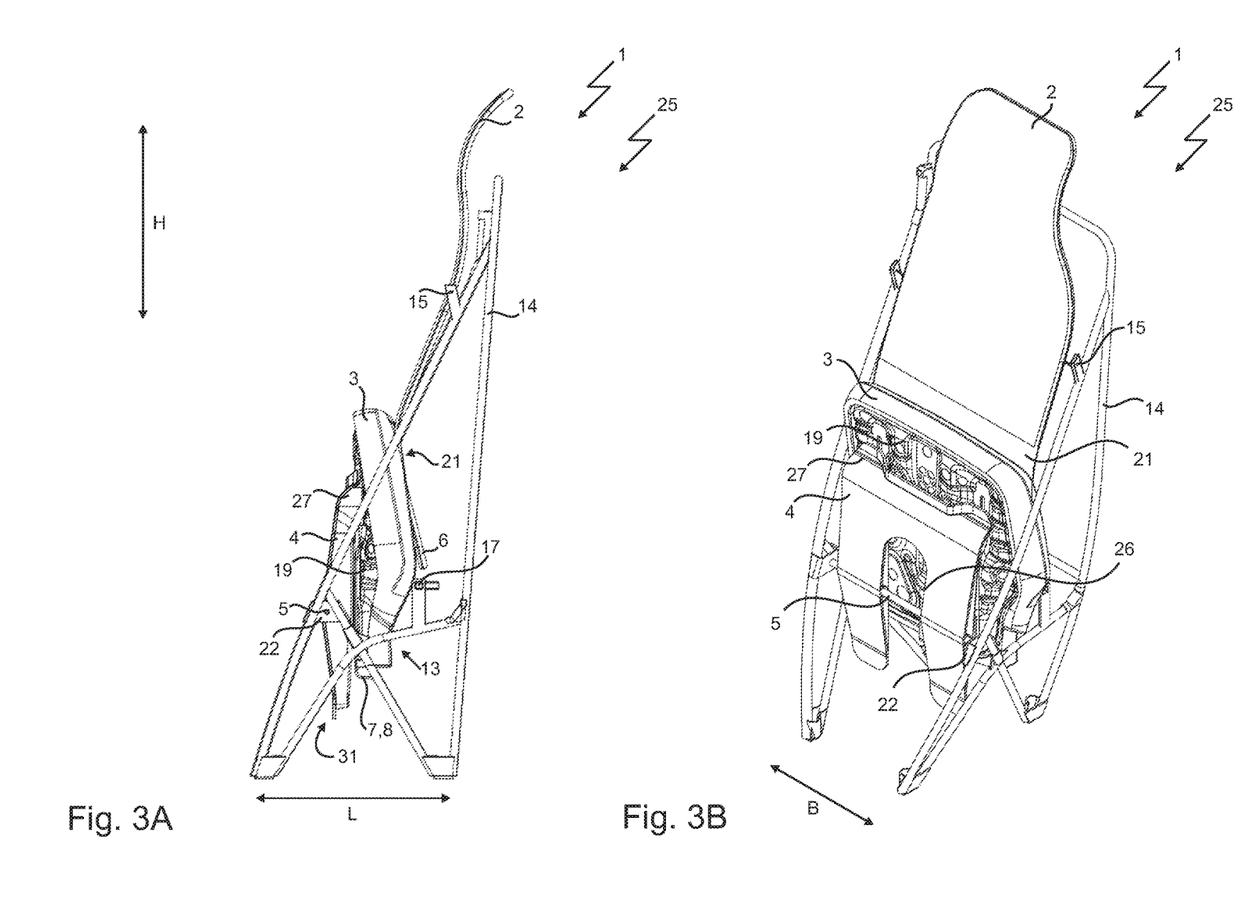
FIG. 3A shows the vehicle seat according to FIG. 1A in the upright position.
FIG. 3B is a perspective view of the vehicle seat according to FIG. 3B, and FIG. 4A-4E show different embodiments of the releasable connection element.

It can be particularly seen in FIG. 3B that two end stops 16 are provided on the seat part substructure 4. Of course, a different number of end stops 16 can also be used. The seat part substructure 4 is preferably configured symmetrically with respect to the longitudinal direction L of the seat and it has a material recess 26 to reduce weight. However, the stability of the seat part substructure 4 is still in a range which meets the safety requirements.

As can also be seen from the figures, the seat part substructure 4 can have in the front region thereof an upwardly directed and upwardly drawn region 27, seen in the longitudinal direction L of the seat. The upwards height orientation of the seat part can be changed by this region 27. However, since an elevation of this type is not provided in the rear region of the seat part substructure 4, it is possible to install spring elements and/or damper elements (not shown here) between the seat part 3, in particular between the seat shell 19 and the seat part substructure 4 which further enhance the passenger's sitting comfort.

If it is now desired to create additional free space or to make it easier for another passenger to reach a further seat located next to the seat, the seat part substructure 4 together with the seat part 3 can be swivelled into the upright position 25. To save further costs and to further reduce weight, this swivelling movement is carried out manually. However, it is also conceivable that a swivelling movement can be carried out by a motor (not shown here), for example by an electric motor.

Figures 2A, 2B:
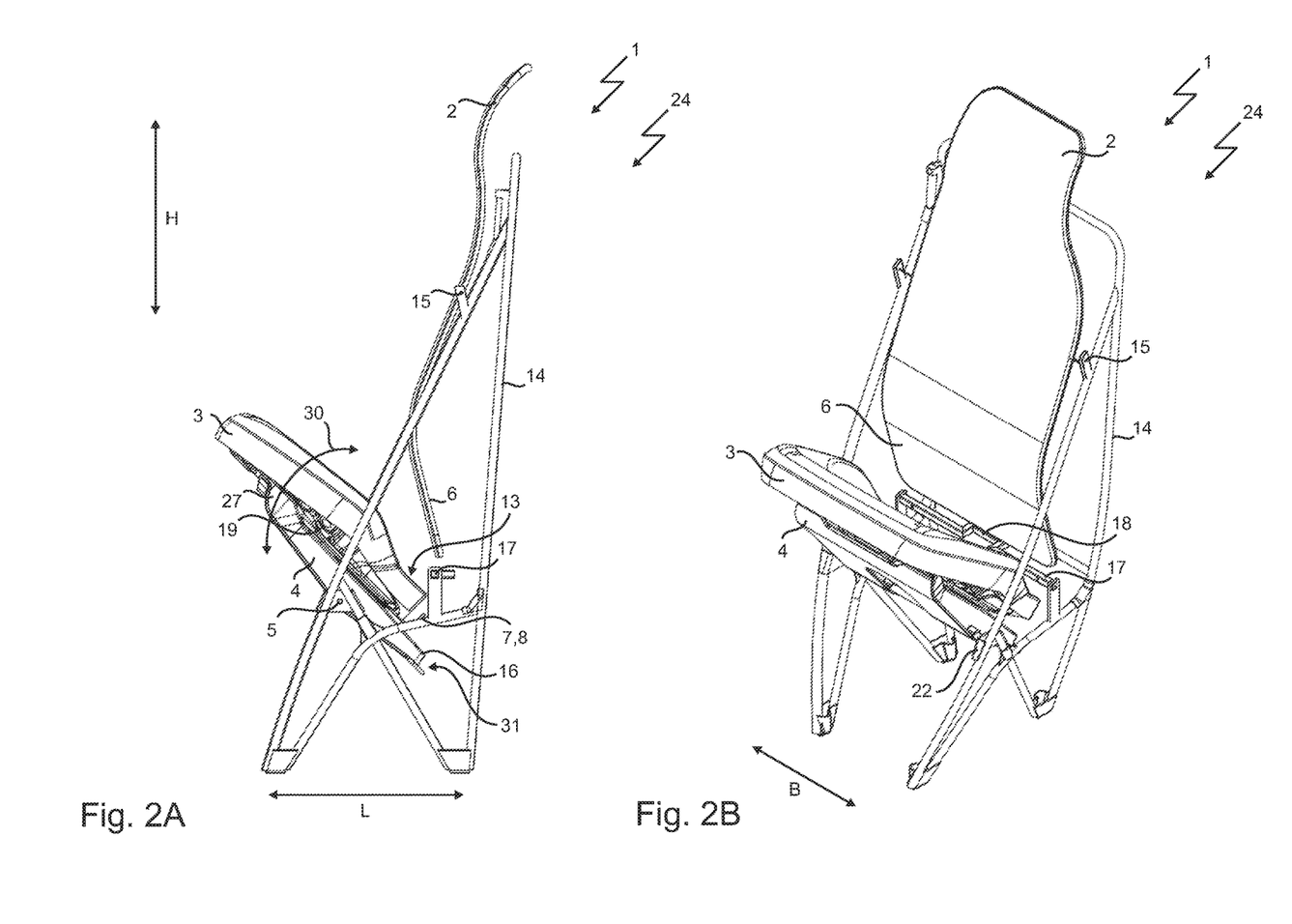
FIG. 2A shows the vehicle seat according to FIG. 1A during a swivelling movement.
FIG. 2B is a perspective view of the vehicle seat according to FIG. 2A.

During this upwards swivelling movement with respect to the height direction H of the seat, the seat part substructure 4 together with the seat part 3 is in an intermediate position 24, as can be seen in FIGS. 2A and 2B.

As clearly shown by FIGS. 2A and 2B, the connection of the lower region 6 of the backrest 2 to the seat part 3 is no longer connected by the releasable connection means 7. The backrest 2, as shown in the figures, is attached to a seat frame 14 such that it can swivel about a second swivel axis 15 so that the lower region 6 of the backrest 2 moves backwards, seen in the longitudinal direction L of the seat. The connection of the end stop 16 to the cross strut 17 has also been released. This would therefore mean that the seat part 3 and the seat part substructure 4 would automatically return into the sitting position 23. Therefore, it is advantageous for the end stop 16 to have at least one small spring element (not shown here) when, due to careless handling, for example by accidentally letting go of the seat part 3 and/or of the seat part substructure 4, the impact of the end stop 16 on the cross strut 17 is reduced.

To also allow the seat part 3 to swivel in a position in which the seat part 3 has been moved fully backwards with respect to the longitudinal direction L of the seat and in which the releasable connection element 7 would possibly strike the cross strut 17, thereby preventing a swivelling movement, the cross strut 17 has a recess 18. When the seat part substructure 4 has completed the upwards swivelling movement, the seat part 3 is in the upright position 25, as can be seen in FIGS. 3A and 3B. The seat part 3 and the seat part substructure 4 are now substantially arranged in the height direction H of the seat. Since the first swivel axis 5 is arranged in a lower region with respect to the height direction H of the seat, the seat part substructure 4 and the seat part 3 located thereon tend to further rotate in a clockwise direction. To prevent this, it is expedient that the backrest 2 and in particular a further region 21 of the backrest 2 serves as a stop for the seat part 3. In this respect, the further region 21 is arranged above the lower region 6 of the backrest 2. However, it is also conceivable that it is not the backrest 2 but additional elements of the seat frame 14, for example additional projections attached to the original seat frame 14, which are provided to prevent further swivelling of the seat part substructure 4. However, to further reduce weight, it is advantageous to use the backrest 2 as a stop. The folding seat 1 is thus also held in a stable manner in its upright position 25.

To then swivel the seat 1 out of the upright position 25 back into the sitting position 23, it is therefore necessary for the passenger to firstly bring the seat part substructure 4 or the seat part 3 respectively back into the intermediate position 24.

During the swivelling movement out of the upright position 25 into the sitting position 23, a connection is preferably automatically produced between the backrest and the seat part 3 by the releasable connection element 7. This is achieved in a particularly favourable manner when the releasable connection element 7 is configured as a hook element 8.

The connection element 7 or the hook element 8 respectively can be of a simple construction when the hook element 8 comprises an angle plate 28, as can be seen in FIG. 4A-4D.

Figure 4A:
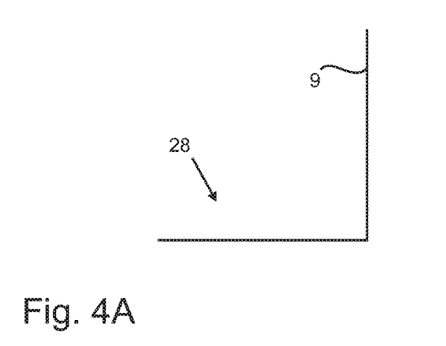

In FIG. 4A, the hook element is merely configured as an angle plate 28, which corresponds to the simplest embodiment.

Figure 4B:
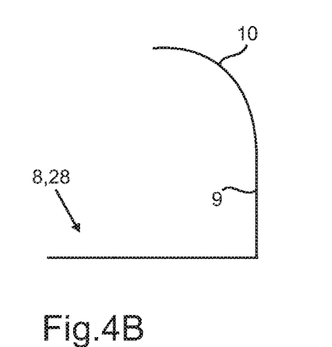
Figure 4C:
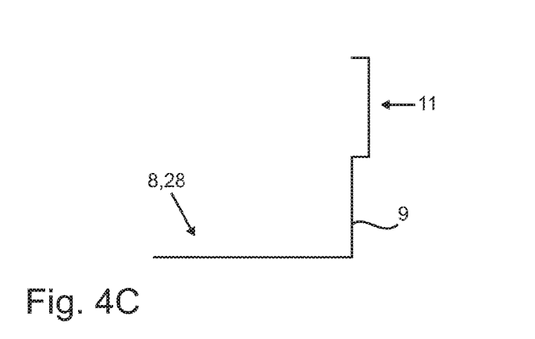
Figure 4D:
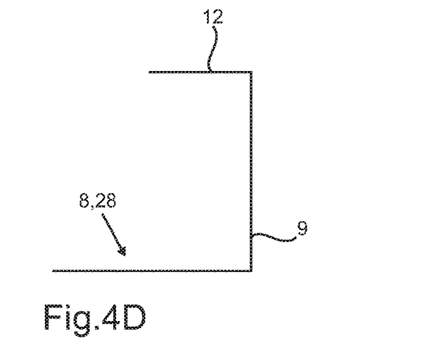

FIG. 4B-4D show in addition to the angle plate 28 an upwardly directed region 9 which is formed in different ways. In FIG. 4B, region 9 is arched, the arched region 10 being curved forwards, seen in the longitudinal direction L of the seat. In FIG. 4C, region 9 is substantially configured as a C-shaped element 11, and in FIG. 4D as a straight, forwardly directed portion 12. Further embodiments which are not shown here are possible.

Figure 4E:
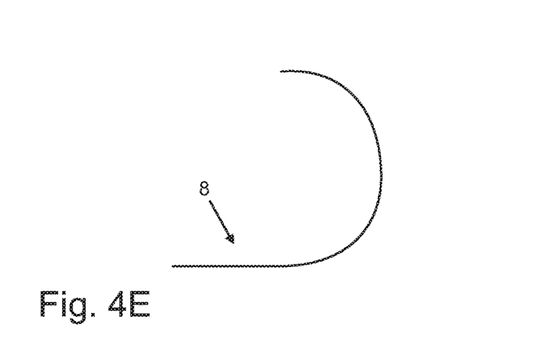

An embodiment which does not comprise an angle plate can be seen in FIG. 4E. Here, the hook element is arched, in this specific case it is configured as an asymmetrical U-shaped hook element.

The lower end 6 of the backrest 2 can be advantageously accommodated due to the additional particular configuration of region 9. In particular, the configurations of region 9 also have a positive effect when the seat part 3 is moved into the sitting position. During a movement of the seat part 3, the lower end 6 of the backrest can be entrained particularly effectively by region 9, thereby also preventing the lower region 6 from becoming unhooked.

All the features disclosed in the application documents are claimed as being essential to the invention provided that, individually or combined, they are novel over the prior art.

LIST OF REFERENCE SIGNS 1 vehicle seat
2 backrest
3 seat part
4 seat part substructure
5 first swivel axis
6 lower region
7 releasable connection means
8 hook element
9 upwardly directed region
10 arched portion
11 C-shaped portion
12 forwardly directed portion
13 rear end region
14 seat frame
15 second swivel axis
16 end stop
17 cross strut
18 recess
19 seat shell
20 cushion element
21 further region of the backrest
22 mount
23 sitting position
24 intermediate position
25 upright position
26 material recess
27 upwardly directed region of the seat part substructure
28 angle plate
29 upwardly directed region of the angle plate
30 swivelling direction
31 rear region of the seat part substructure
H height direction of the seat
L longitudinal direction of the seat
B width direction of the seat

What is claimed is:

1. A vehicle seat comprising:
a backrest;
a seat part; and
a seat part substructure, the seat part substructure being mounted such that it can swivel about a first swivel axis arranged in a width direction of the seat in order to move the seat part substructure together with the seat part from a sitting position into an upright position, wherein a lower region of the backrest with respect to a height direction of the seat and at least one of a rear region of the seat part and of the seat part substructure with respect to a longitudinal direction of the seat are interconnected in the sitting position by at least one releasable connection means and are not interconnected in the upright position, wherein the first swivel axis is fixed in a rotational manner to the seat part substructure, wherein the at least one releasable connection means is connected to the seat part, and wherein the seat part with the at least one releasable connection means is moveable with respect to the seat part substructure at least in the longitudinal direction of the seat.

2. The vehicle seat according to claim 1, wherein during a movement of the seat part with respect to the seat part substructure, the lower region of the backrest is connected to at least one of the seat part and to the seat part substructure by the at least one releasable connection means while retaining the sitting position.

3. The vehicle seat according to claim 1, wherein the at least one releasable connection means is configured as a hook element.

4. The vehicle seat according to claim 3, wherein the hook element comprises at least one of an angle plate and is arched.

5. The vehicle seat according to claim 4, wherein the angle plate has on the upwardly directed region an arched portion, a C-shaped portion or a portion which is formed forwards with respect to the longitudinal direction of the seat.

6. The vehicle seat according to claim 1, wherein the at least one releasable connection means is arranged on the rear region of the seat part.

7. The vehicle seat according to claim 1, wherein the backrest is flexible at least in the lower region thereof at least in the longitudinal direction of the seat.

8. The vehicle seat according to claim 1, wherein the backrest and the seat part substructure are connected to a seat frame.

9. The vehicle seat according to claim 8, wherein the backrest is suspended on the seat frame such that it can swivel about a second swivel axis extending in the width direction of the seat.

10. The vehicle seat according to claim 8, wherein the seat part substructure has at least one end stop in its rear region and the seat frame has at least one cross strut which extends in the width direction of the seat and on which the at least one end stop rests in the sitting position to hold the seat part substructure in the sitting position.

11. The vehicle seat according to claim 10, wherein the at least one cross strut is adjustable at least in the height direction of the seat and has at least one recess to prevent contact between the cross strut and the at least one releasable connection means during a swiveling movement of the seat part substructure.

12. The vehicle seat according to claim 10, wherein the at least one cross strut is adjustable at least in the height direction of the seat.

13. The vehicle seat according to claim 10, wherein the at least one cross strut has at least one recess to prevent contact between the cross strut and the at least one ret connection means during a swiveling movement of the seat part and structure.

14. A vehicle seat comprising:
a backrest;
a seat part; and
a seat part substructure, the seat part substructure being mounted such that it can swivel about a first swivel axis arranged in a width direction of the seat in order to move the seat part substructure together with the seat part from a sitting position into an upright position, wherein a lower region of the backrest with respect to a height direction of the seat and at least one of a rear region of the seat part and of the seat part substructure with respect to a longitudinal direction of the seat are interconnected in the sitting position by at least one releasable connection means and are not interconnected in the upright position, wherein the backrest and the seat part substructure are connected to a seat frame, and wherein the seat part substructure has at least one end stop in its rear region and the seat frame has at least one cross strut which extends in the width direction of the seat and on which the at least one end stop rests in the sitting position to hold the seat part substructure in the sitting position, wherein the at least one cross strut is adjustable at least in the height direction of the seat and has at least one recess to prevent contact between the cross strut and the at least one releasable connection means during a swiveling movement of the seat part sub structure.

15. A vehicle seat comprising:
a backrest;
a seat part; and
a seat part substructure, the seat part substructure being mounted such that it can swivel about a first swivel axis arranged in a width direction of the seat in order to move the seat part substructure together with the seat part from a sitting position into an upright position, wherein a lower region of the backrest with respect to a height direction of the seat and at least one of a rear region of the seat part and of the seat part substructure with respect to a longitudinal direction of the seat are interconnected in the sitting position by at least one releasable connection means and are not interconnected in the upright position, wherein the backrest and the seat part substructure are connected to a seat frame, and wherein the seat part substructure has at least one end stop in its rear region and the seat frame has at least one cross strut which extends in the width direction of the seat and on which the at least one end stop rests in the sitting position to hold the seat part substructure in the sitting position, wherein the at least one cross strut is adjustable at least in the height direction.

* * * * *